Sept. 20, 1966  J. S. ECKERT  3,273,872
DISTRIBUTOR PLATE
Filed Jan. 28, 1963  2 Sheets-Sheet 1

INVENTOR.
JOHN S. ECKERT
BY
ATTORNEY

Sept. 20, 1966     J. S. ECKERT     3,273,872

DISTRIBUTOR PLATE

Filed Jan. 28, 1963     2 Sheets-Sheet 2

INVENTOR.
JOHN S. ECKERT
BY
ATTORNEY

United States Patent Office 3,273,872
Patented Sept. 20, 1966

3,273,872
DISTRIBUTOR PLATE
John S. Eckert, Silver Lake, Ohio, assignor to The United States Stoneware Company, Tallmadge, Ohio, a corporation of Ohio
Filed Jan. 28, 1963, Ser. No. 254,189
9 Claims. (Cl. 261—96)

This invention relates to a distributor plate and its manufacture.

The distributor plate of this invention comprises a plurality of concentric, generally circular walls with an annular floor between each two walls. Generally, the distributor is a weir-type distributor. Each wall is provided with downwardly narrowing openings, usually narrow triangles, for the passage of gas and liquid.

The openings in the wall on one side of the floor, usually the wall at the outer edge of the floor, are located just above the floor and as liquid flows from the floor through these openings the well-known principle of downwardly narrowing weir openings is utilized to control the flow of the liquid therethrough. This regulates the depth of the liquid on the floor, and thus controls the flow of liquid through the openings in the wall at the opposite edge of the floor.

The openings in the other wall are positioned partially above the floor and partially below the floor. Liquid flows off of the floor through the portion of the openings above the floor, and gas may flow simultaneously up through the lower part of the openings below the floor. Any number of walls may be arranged concentrically with floors between them.

A primary advantage of this structure is its low cost construction, in addition to the fact that it is a very good distributor, a desirable feature being that as the diameter of the tower decreases, the number of distributor points per square foot increases. The walls can be formed of sheet metal of any length, and then cut to any length for construction of circular walls of desired diameter, all of the same height.

Generally, a baffle will be provided intermediate each two walls to prevent liquid which is supplied onto the floor through one wall from surging across to the wall at the opposite edge of the floor.

The distributor plate is designed for use in any packed tower, above any one or more of the beds of packing elements located therein. If used between two packing beds, the distributor plate is ordinarily used in connection with a collector and a support plate for the upper bed. Alternatively, it may be located under the support plate without a collector intervening, in which case it serves as a partial distributor. The collector, when used, collects liquid draining from the upper bed and delivers it to this distributor which distributes it over the surface of the lower bed.

The invention is further described in connection with the accompanying drawings, in which.

The three concentric circular walls 1, 2 and 3 of the distributor are identical, except as to circumference. They may be cut from the same long sheet-metal stamping. The tall but narrow triangular openings 5, 6 and 7 in the respective walls are identical and spaced the same distance from the bottom of each wall. The distributor may comprise as many as six or ten or more of these walls, and they may all be cut from the same perforated strip.

Figure 1:
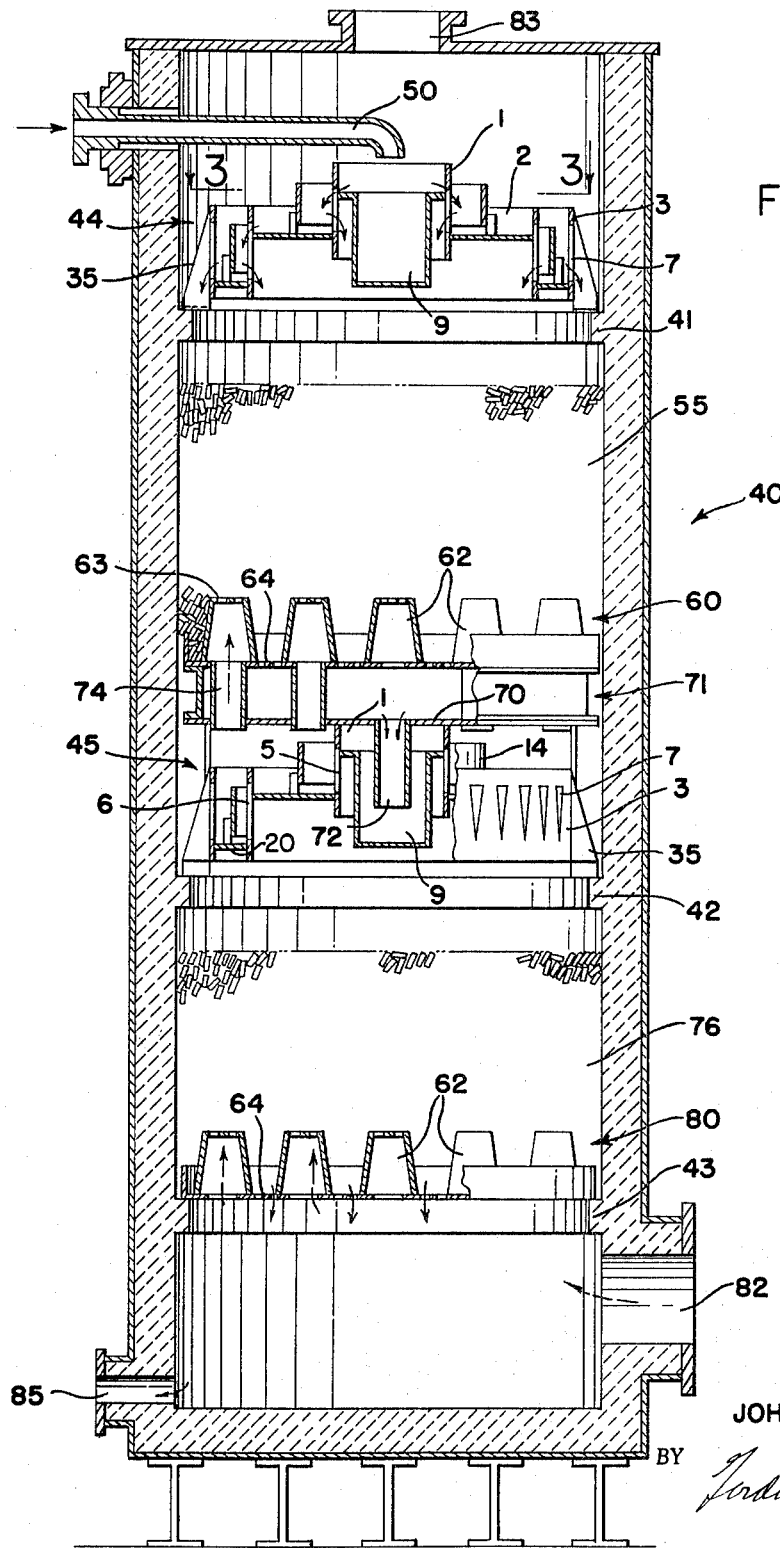
FIGURE 1 is a section through a tower provided with two beds of packing elements, with one distributor of this invention immediately above each bed, the lower distributor being combined with a support plate for the upper bed and a collector between the support plate and the lower distributor.
Figure 2:
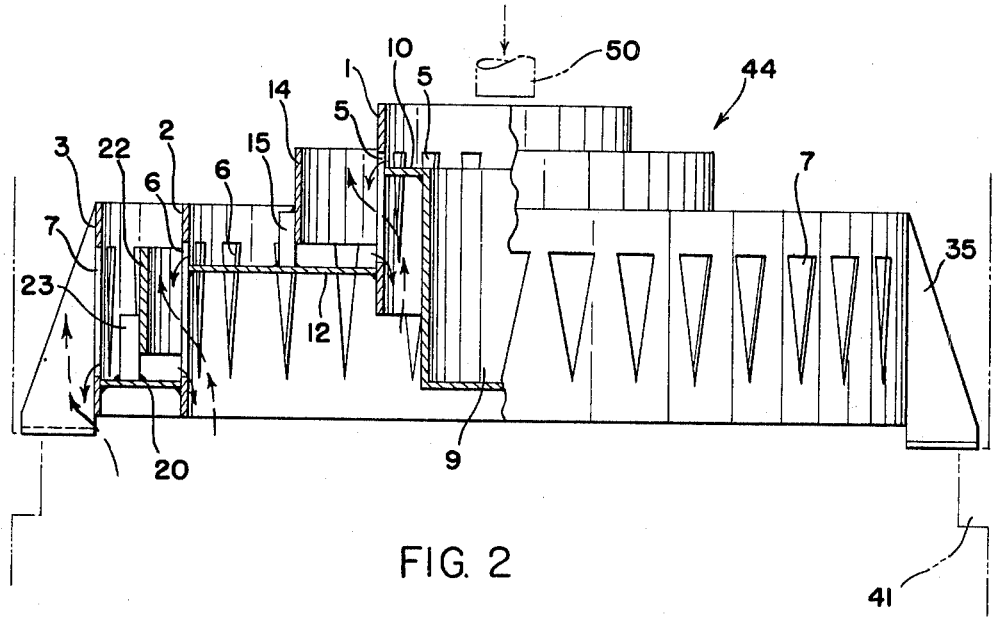
FIGURE 2 is an enlarged elevation, partly broken away, of the distributor.
Figure 3:
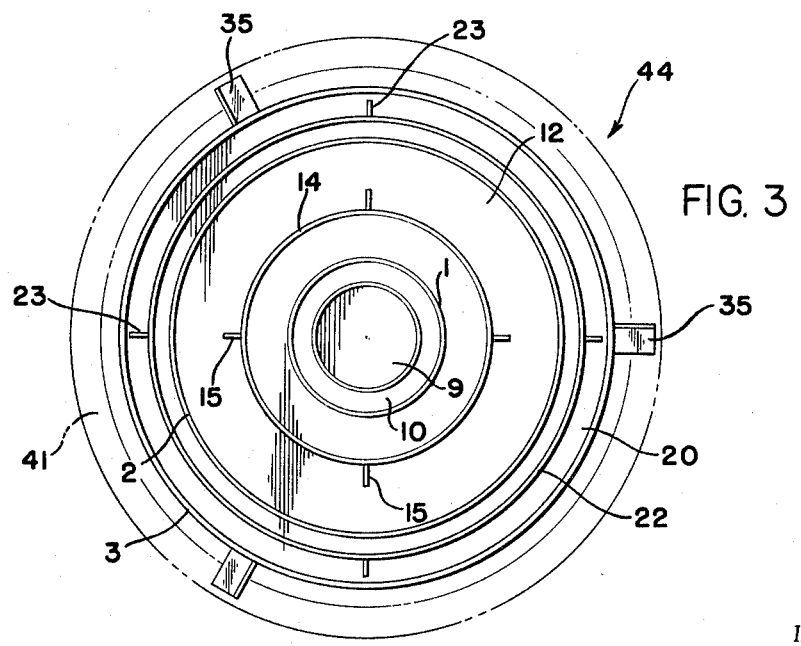
FIGURE 3 is a plan view of the distributor.

FIGURES 2 and 3 show a more detailed and complete disclosure of the invention than is shown in FIGURE 1. Within the wall 1 is the stilling sump 9 supported from the annular floor 10 which is welded to the wall 1 with about one-quarter of the length of the openings 5 above it and three-quarters below it. The position of the floor with respect to the openings may be varied, depending upon the size of the distributor, to give the best liquid ratio after the first flow. As liquid is delivered to the stilling sump 9 it becomes filled and the liquid overflows the floor 10, and flows out through the tops of the openings 5. The shape of the openings is unimportant in this connection, but they are made of such shape that they narrow downwardly in order to regulate the flow of liquid through their lower ends, as will be described. As liquid flows in through the lower portion of these openings, some of the gas flowing up through the tower passes out through them.

The liquid that flows out through the upper part of openings 5 is caught on the annular floor 12. The circular baffle 14 supported above the floor by supports 15 prevents the liquid entering through openings 5 from surging across the floor to its outer edge. Thus there is a relatively level body of the liquid on the floor. Some liquid flows through the bottom of the openings 5 which narrow to a point at their bottom just above the floor 12, and thus tend to maintain the depth of this body of liquid relatively constant, utilizing the well known principle of the operation of V-weirs. At the outer edge of the floor 12 the liquid flows through the tops of openings 6 in the intermediate wall 2 on to the floor 20 below it. Although the tops of the openings 6 narrow downwardly, they are large enough so that their shape is relatively unimportant. The shape of the bottoms of the openings 5 at the other side of this floor 12 keeps the liquid level relatively constant and thus regulates the outward flow of the liquid through openings 6.

The circular baffle 22 supported up off of the floor 20 by supports 23 prevents rush of the liquid to the outer edge of this floor. The bottoms of the openings 6 and 7 are located just above the floor 20, and being V-weirs, regulate the flow of liquid from the floor so that the depth of the liquid on this floor 20 remains relatively constant. A very little gas passes up through the opening 6 toward the baffle 22, and up through the tower.

The distributor is provided with supports 35 which support it up off of the ledge in the tower.

In the tower 40 of FIGURE 1 are the ledges 41, 42 and 43. Distributors 44 and 45 which are of the type shown in FIGURES 1 and 2, rest on the ledges 41 and 42, respectively. The supports 35 hold the distributors up off of the ledges so that some of the gas passing up through the tower flows up between the ledge and the bottom of the distributor, and thus up between the wall 3 of the distributor and the wall of the tower.

Liquid is introduced into the tower through inlet 50 for any desired purpose such as for washing the gases, fractionation of the liquid, condensation of the gases, etc. The liquid fills the sump 9 in the top distributor. This overflows, part flowing down into the tower through openings 5, and the rest flowing down through the openings 6 and 7 on opposite sides of the floor 20. The efficiency of the distributor depends upon the number and diameters of the walls with openings it comprises.

The bed 55 is held on support plate 60, or a support plate of other design. The risers 62 are provided with tops 63 which are perforated, and the base 64 also is perforated. The tops are not necessary. The liquid collects on the base and flows through the perforations in it. The gas escapes up through the risers.

The liquid is collected on the floor 70 of the collector 71 and flows down through the feed 72 into the stilling sump 9 of the lower distributor 45. The liquid which collects in the sump seals off the feed 72 so that no gas passes up through the feed 72. The gas passing up through the tower is conducted through the cylindrical conduits or stacks 74 out of contact with the liquid. The liquid draining from the bed 55 is collected by collector 71 and re-distributed by the distributor 45 onto the bed 76. The latter is supported on support plate 80 which is similar to the plate 60.

Gases enter the tower at 82 and leave at 83. The liquid is drawn off through the outlet 85.

The tower is illustrative. Towers of many other constructions can be used. The support plates may be of any construction. The collector shown is of the preferred type.

The invention is covered in the claims which follow.

I claim:

1. A distributor plate which comprises at least two concentric circular weir walls, each wall having therein a series of downwardly narrowing openings, an annular floor between the walls and contacting each, with the floor contacting the first wall below the openings therein and contacting the second wall at a position between the tops and the bottom of the openings therein whereby when liquid is on the floor the bottoms of the downwardly narrowing openings restrict and regulate the amount of liquid which flows through the first wall while liquid is simultaneously flowing through the upper parts of the openings in the second wall.

2. The distributor plate of claim 1 in which there is a generally circular baffle concentric with the walls located between the walls.

3. The distributor plate of claim 1 in which the first wall is within the second wall.

4. The combination of (1) the distributor plate of claim 1 in which the first wall is within the second wall, there is a second floor within the first wall located between the tops and bottoms of the openings therein, and the portions of said openings below the second floor narrow downwardly, and (2) means for supplying liquid on to the second floor.

5. The combination of claim 4 in which the means for supplying liquid is the delivery means of a collector with a single delivery means.

6. A distributor plate which comprises three concentric walls of the same height, each having downwardly narrowing generally triangular openings therein which are narrower than they are high, all arranged identically in each wall, the inside wall being above the intermediate wall and the intermediate wall and the outside wall having their bottom edges in the same plane, a first annular floor spanning the space between the outside wall and the intermediate wall, a second annular floor spanning the space between the intermediate wall and the inside wall, each floor contacting the wall inside of it just below the openings therein, the second floor contacting the wall outside of it at a location between the tops and bottoms of the openings therein, the first floor contacting the outside wall just below the openings therein, a third floor within the inside wall which contacts it at a location between the tops and bottom of the openings therein, and a generally circular baffle supported just above each of the first and second floors and concentric with the walls.

7. The combination of:
   (A) a distributor plate which comprises three concentric walls of the same height, each having downwardly narrowing generally triangular openings therein which are narrower than they are high, all arranged identically in each wall, the inside wall being above the intermediate wall and the intermediate wall and the outside wall having their bottom edges in the same plane, a first annular floor spanning the space between the outside wall and the intermediate wall, a second annular floor spanning the space between the intermediate wall and the inside wall, each floor contacting the wall inside of it just below the openings therein, the second floor contacting the wall outside of it at a location between the tops and bottoms of the openings therein, the first floor contacting the outside wall just below the openings therein, a third floor within the inside wall which contacts it at a location between the tops and bottoms of the openings therein, and a generally circular baffle supported just above each of the first and second floors and concentric with the walls, and
   (B) a collector which includes a floor on which a liquid is collected, a stilling sump located centrally of the floor which is within the inside wall, single delivery means extending downwardly into the stilling sump from near the center of the collecting floor, said collector having openings in the floor and stacks rising from said openings to convey a gas through the collector out of contact with the liquid.

8. A packed tower which includes a tower, a distributor plate therein and packing above the distributor plate, which distributor plate comprises at least two concentric circular weir walls, each wall having therein a series of downwardly narrowing openings, an annular floor between the walls and contacting each, with the floor contacting the first wall below the openings therein and contacting the second wall at a position between the tops and the bottoms of the openings therein whereby when liquid is on the floor the bottoms of the downwardly narrowing openings restrict and regulate the amount of liquid which flows through the first wall while liquid is simultaneously flowing through the upper parts of the openings in the second wall.

9. A packed tower which includes a tower, a distributor plate therein and packing above the distributor plate, which distributor plate comprises three concentric walls of the same height, each having downwardly narrowing generally triangular openings therein which are narrower than they are high, all arranged identically in each wall, the inside wall being above the intermediate wall and the intermediate wall and the outside wall having their bottom edges in the same plane, a first annular floor spanning the space between the outside wall and the intermediate wall, a second annular floor spanning the space between the intermediate wall and the inside wall, each floor contacting the wall inside of it just below the openings therein, the second floor contacting the wall outside of it at a location between the tops and bottoms of the openings therein, the first floor contacting the outside wall just below the openings therein, a third floor within the inside wall which contacts it at a location between the tops and bottoms of the openings therein, and a generally circular baffle supported just above each of the first and second floors and concentric with the walls.

References Cited by the Examiner

UNITED STATES PATENTS

| | | | |
|---|---|---|---|
| 998,930 | 7/1911 | Tait | 261—98 X |
| 2,428,922 | 10/1947 | Shoreman | 261—95 |
| 2,639,130 | 5/1953 | Heere | 261—97 |
| 2,646,762 | 7/1953 | Ingraham et al. | 113—116 |
| 3,066,631 | 12/1962 | Geary | 113—116 |
| 3,099,697 | 7/1963 | Lerman et al. | 261—97 |

HARRY B. THORNTON, *Primary Examiner.*

RONALD R. WEAVER, *Examiner.*

E. H. RENNER, *Assistant Examiner.*